US009330682B2

(12) United States Patent
Suzuki et al.

(10) Patent No.: US 9,330,682 B2
(45) Date of Patent: *May 3, 2016

(54) APPARATUS AND METHOD FOR DISCRIMINATING SPEECH, AND COMPUTER READABLE MEDIUM

(75) Inventors: Kaoru Suzuki, Kanagawa-ken (JP); Masaru Sakai, Tokyo (JP); Yusuke Kida, Kanagawa-ken (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 262 days.

This patent is subject to a terminal disclaimer.

(21) Appl. No.: 13/232,469

(22) Filed: Sep. 14, 2011

(65) Prior Publication Data

US 2012/0232890 A1    Sep. 13, 2012

(30) Foreign Application Priority Data

Mar. 11, 2011    (JP) ................. 2011-054759

(51) Int. Cl.
*G10L 25/78*    (2013.01)
*H04M 9/08*    (2006.01)
(Continued)

(52) U.S. Cl.
CPC .............. *G10L 25/78* (2013.01); *G10L 25/18* (2013.01); *G10L 2021/02082* (2013.01); *H04M 9/082* (2013.01)

(58) Field of Classification Search
CPC ............ G10L 25/78; G10L 2021/02082; H04M 9/082
USPC ............ 704/200–233; 379/406.01, 88.01, 379/88.07; 381/66, 71.1, 94.1
See application file for complete search history.

(56) References Cited

U.S. PATENT DOCUMENTS 6,556,682 B1 * 4/2003 Gilloire et al. ............ 381/66
6,654,450 B1 * 11/2003 Aigner et al. ............ 379/100.16
(Continued)

FOREIGN PATENT DOCUMENTS

JP    2002-300687    10/2002
JP    2003-271191    9/2003
(Continued)

OTHER PUBLICATIONS

Japanese Office Action for Japanese Application No. 2011-054759 mailed on Jul. 25, 2014.
(Continued)

*Primary Examiner* — Jialong He
(74) *Attorney, Agent, or Firm* — Amin, Turocy & Watson LLP; Gregory Turocy

(57) ABSTRACT

According to one embodiment, an apparatus for discriminating speech/non-speech of a first acoustic signal includes a weight assignment unit, a feature extraction unit, and a speech/non-speech discrimination unit. The first acoustic signal includes a user's speech and a reproduced sound. The reproduced sound is a system sound having a plurality of channels reproduced from a plurality of speakers. The weight assignment unit is configured to assign a weight to each frequency band based on the system sound. The feature extraction unit is configured to extract a feature from a second acoustic signal based on the weight of each frequency band. The second acoustic signal is the first acoustic signal in which the reproduced sound is suppressed. The speech/non-speech discrimination unit is configured to discriminate speech/non-speech of the first acoustic signal based on the feature.

10 Claims, 9 Drawing Sheets

(51) Int. Cl.
*G10L 25/18* (2013.01)
*G10L 21/0208* (2013.01)

(56) References Cited

U.S. PATENT DOCUMENTS

| | | | |
|---|---|---|---|
| 6,738,480 B1* | 5/2004 | Berthault et al. | 381/66 |
| 7,043,013 B2* | 5/2006 | Le Tourneur et al. | 379/406.04 |
| 7,333,618 B2* | 2/2008 | Shuttleworth et al. | 381/57 |
| 7,412,382 B2* | 8/2008 | Noda et al. | 704/233 |
| 7,881,927 B1* | 2/2011 | Reuss | 704/226 |
| 2002/0054685 A1* | 5/2002 | Avendano et al. | 381/66 |
| 2002/0101981 A1* | 8/2002 | Sugiyama | 379/406.01 |
| 2002/0169602 A1* | 11/2002 | Hodges | 704/211 |
| 2003/0040908 A1* | 2/2003 | Yang et al. | 704/233 |
| 2005/0055201 A1* | 3/2005 | Florencio et al. | 704/214 |
| 2005/0071159 A1* | 3/2005 | Boman et al. | 704/233 |
| 2005/0108004 A1* | 5/2005 | Otani et al. | 704/205 |
| 2006/0069556 A1* | 3/2006 | Nadjar et al. | 704/229 |
| 2006/0136203 A1* | 6/2006 | Ichikawa | 704/226 |
| 2006/0182268 A1* | 8/2006 | Marton | 379/406.08 |
| 2007/0005350 A1* | 1/2007 | Amada | 704/211 |
| 2007/0253565 A1* | 11/2007 | Fozunbal | 381/66 |
| 2007/0280472 A1* | 12/2007 | Stokes, III et al. | 379/406.01 |
| 2008/0031466 A1* | 2/2008 | Buck | H04M 9/082 381/66 |
| 2008/0031467 A1* | 2/2008 | Haulick et al. | 381/66 |
| 2008/0059164 A1* | 3/2008 | Furuta et al. | 704/226 |
| 2008/0071547 A1* | 3/2008 | Prieto et al. | 704/275 |
| 2008/0239939 A1* | 10/2008 | Parnaby et al. | 370/201 |
| 2009/0003586 A1* | 1/2009 | Lai et al. | 379/406.01 |
| 2009/0010445 A1* | 1/2009 | Matsuo | 381/66 |
| 2009/0089054 A1* | 4/2009 | Wang et al. | 704/233 |
| 2009/0154726 A1* | 6/2009 | Taenzer | 381/94.1 |
| 2009/0281805 A1* | 11/2009 | LeBlanc et al. | 704/233 |
| 2009/0310796 A1* | 12/2009 | Seydoux | 381/71.1 |
| 2009/0316923 A1* | 12/2009 | Tashev et al. | 381/66 |
| 2009/0323924 A1* | 12/2009 | Tashev et al. | 379/406.05 |
| 2010/0013987 A1* | 1/2010 | Edler et al. | 348/425.2 |
| 2010/0030558 A1* | 2/2010 | Herbig et al. | 704/240 |
| 2011/0178798 A1* | 7/2011 | Flaks et al. | 704/226 |
| 2011/0191102 A1* | 8/2011 | Espy-Wilson et al. | 704/207 |
| 2011/0238417 A1 | 9/2011 | Yamamoto et al. | |
| 2013/0121497 A1* | 5/2013 | Smaragdis et al. | 381/66 |

FOREIGN PATENT DOCUMENTS

| | | |
|---|---|---|
| JP | 2005-084253 | 3/2005 |
| JP | 2009-216835 | 9/2009 |
| JP | 2011-002535 | 1/2011 |

OTHER PUBLICATIONS

Kaoru Suzuki, et al.; Development of a Barge-in Tolerant Speech Recognition Engine; Acoustical Society of Japan, CD-ROM of Proceedings of 2010 Autumn Meeting; Sep. 2010; pp. 35-38.

* cited by examiner

APPARATUS AND METHOD FOR DISCRIMINATING SPEECH, AND COMPUTER READABLE MEDIUM

CROSS-REFERENCE TO RELATED APPLICATION

This application is based upon and claims the benefit of priority from Japanese Patent Application No. 2011-054759, filed on Mar. 11, 2011; the entire contents of which are incorporated herein by reference.

FIELD

Embodiments described herein relate generally to an apparatus and a method for discriminating a speech, and a computer readable medium for causing a computer to perform the method.

BACKGROUND

As to a speech recognition installed into a car-navigation system, a barge-in function to recognize a user's speech during reproducing a system sound (For example, a beep sound or a guidance speech) is prepared. As to a speech discrimination used for preprocessing of the speech recognition, it is required that the user's speech is correctly extracted from an acoustic signal including a reproduced sound (echo) as the system sound reproduced from a speaker. For example, as the speech discrimination to raise robustness for the system sound, a following method is proposed. In this method, a frequency band including a main power of the system sound is specified, and, when a feature is extracted from the acoustic signal, a frequency spectrum in the frequency band is excluded. As to the frequency spectrum in the frequency band including the main power of the system sound, a probability that an influence of the echo is included therein is high. Accordingly, by excluding the frequency spectrum from the frequency band, the feature excluding the influence of the echo (caused by the system sound) can be extracted.

However, in above-mentioned method, a case that the system sound is an acoustic signal of a single channel is imagined. Accordingly, in a case that the system sound is an acoustic signal of a plurality of channels such as a stereo music, this method cannot cope with.

DETAILED DESCRIPTION

According to one embodiment, an apparatus for discriminating speech of a first acoustic signal includes a weight assignment unit, a feature extraction unit, and a speech/non-speech discrimination unit. The first acoustic signal includes a user's speech and a reproduced sound. The reproduced sound is a system sound having a plurality of channels reproduced from a plurality of speakers. The weight assignment unit is configured to assign a weight to each frequency band based on the system sound. The feature extraction unit is configured to extract a feature from a second acoustic signal based on the weight of each frequency band. The second acoustic signal is the first acoustic signal in which the reproduced sound is suppressed. The speech/non-speech discrimination unit is configured to discriminate speech/non-speech of the first acoustic signal based on the feature.

Various embodiments will be described hereinafter with reference to the accompanying drawings.

The First Embodiment

A speech discrimination apparatus of the first embodiment is used as preprocessing of the speech recognition having barge-in function. The speech discrimination apparatus discriminates whether the user's speech is included in an acoustic signal including an echo of a system sound (reproduced from a speaker). In the first embodiment, the system sound is composed by the acoustic signal of a plurality of channels such as a stereo or 5.1ch. The system sound (as an echo) reproduced from the speaker mixes into a first acoustic signal acquired via a microphone.

As to a second acoustic signal which an echo is suppressed from the first acoustic signal by an echo canceller, the speech discrimination apparatus discriminates speech/non-speech. First, the speech discrimination apparatus assigns a weight to each frequency band by using a system sound of a plurality of channels. Concretely, a small weight is assigned to a frequency band including a main element of the system sound (composed by a plurality of channels), and a large weight is assigned to other frequency bands. In a frequency spectrum of the second acoustic signal included in a frequency band having the small weight, a probability which a residual echo of the system sound is included is high. Accordingly, when a feature is extracted from the second acoustic signal, the speech discrimination apparatus makes a degree which a frequency spectrum of the frequency band having the small weight contributes to the feature be smaller.

In this way, a weight is assigned to each frequency band by using the system sound of a plurality of channels. Accordingly, even if the system sound is composed by the plurality of systems, a small weight can be assigned to a frequency band having a high probability which the residual echo is included therein. As a result, a feature from which the echo (caused by the system sound of the plurality of channels) is excluded can be extracted.

Figure 1:
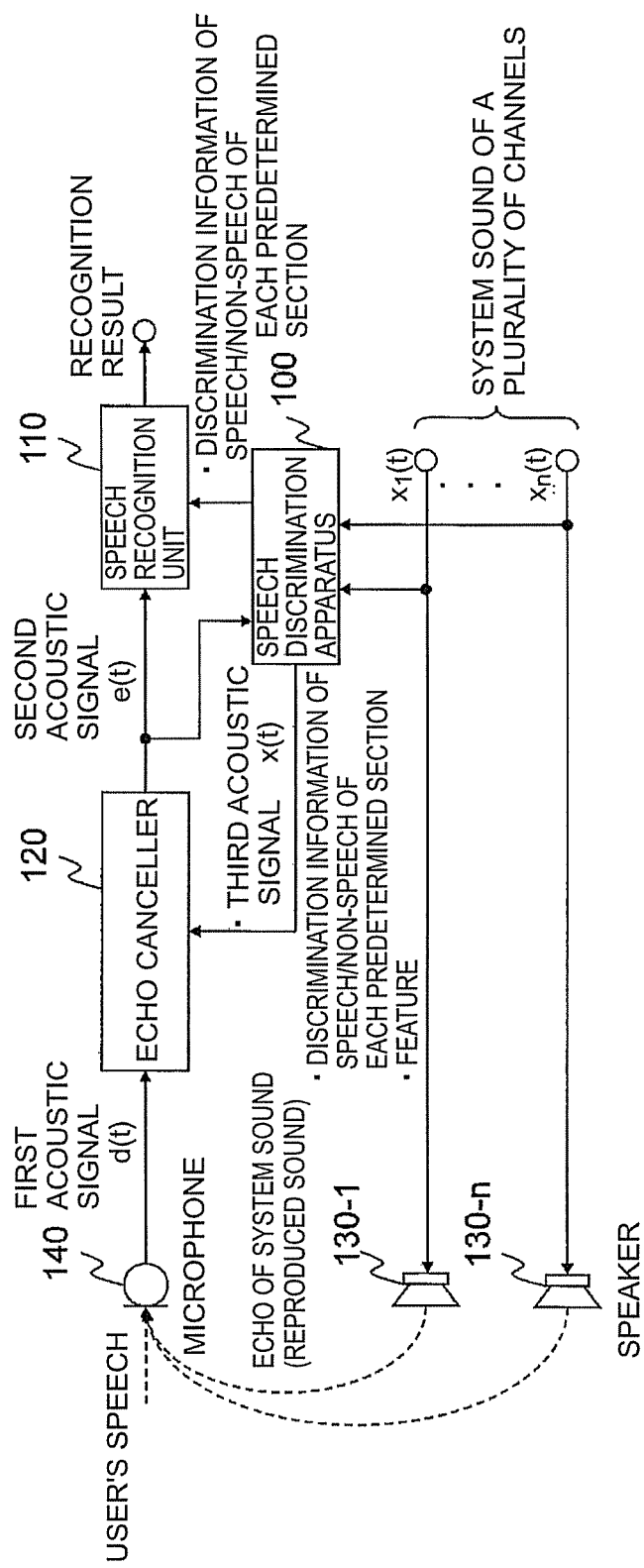
FIG. 1 is a block diagram of a speech recognition system according to a first embodiment.

(Block Component)
FIG. 1 is a block diagram of a speech recognition system including the speech discrimination apparatus of the first embodiment. This speech recognition system has barge-in function to recognize the user's speech during reproducing the system sound. The speech recognition system includes speakers 130-1~130-n, a microphone 140, an echo canceller 120, the speech discrimination apparatus 100, and a speech recognition unit 110.

The speakers (of n units) 130-1~130-n reproduce the system sound composed by a plurality of channels. The microphone 140 acquires a first acoustic signal as a recognition target. The echo canceller 120 generates a second acoustic signal by suppressing an echo included in the first acoustic signal. The speech discrimination apparatus 100 discriminates speech/non-speech of the second acoustic signal. The speech recognition unit 110 recognizes the second acoustic signal (output from the echo canceller 120) by using a discrimination result of speech/non-speech.

System sounds $x_1(t) \sim x_n(t)$ (t: time index representing a discrete time) of n-channels (supplied from a car audio or a television) are reproduced toward a user via speakers 130-1~130-n (prepared for each channel). The system sounds of n-channels (reproduced from the speakers) are received by the microphone 140, as an echo transmitted in space. As a result, in the first acoustic signal d(t) acquired by the microphone 140, the user's speech and the echo of the system sound are mixed. The echo canceller 120 generates the second acoustic signal e(t) which the echo (caused by the system sound of n-channels) is suppressed from the first acoustic signal.

The speech discrimination apparatus 100 divides the second acoustic signal into each section having a predetermined length, and discriminates whether the user's speech is included in each section. The speech recognition unit 110 specifies the user's speech section (between a start point and an end point) by using speech/non-speech discrimination information of each section (output from the speech discrimination apparatus 100). Furthermore, the speech recognition unit 110 executes speech recognition of the second acoustic signal output from the echo canceller 120.

Figure 2:
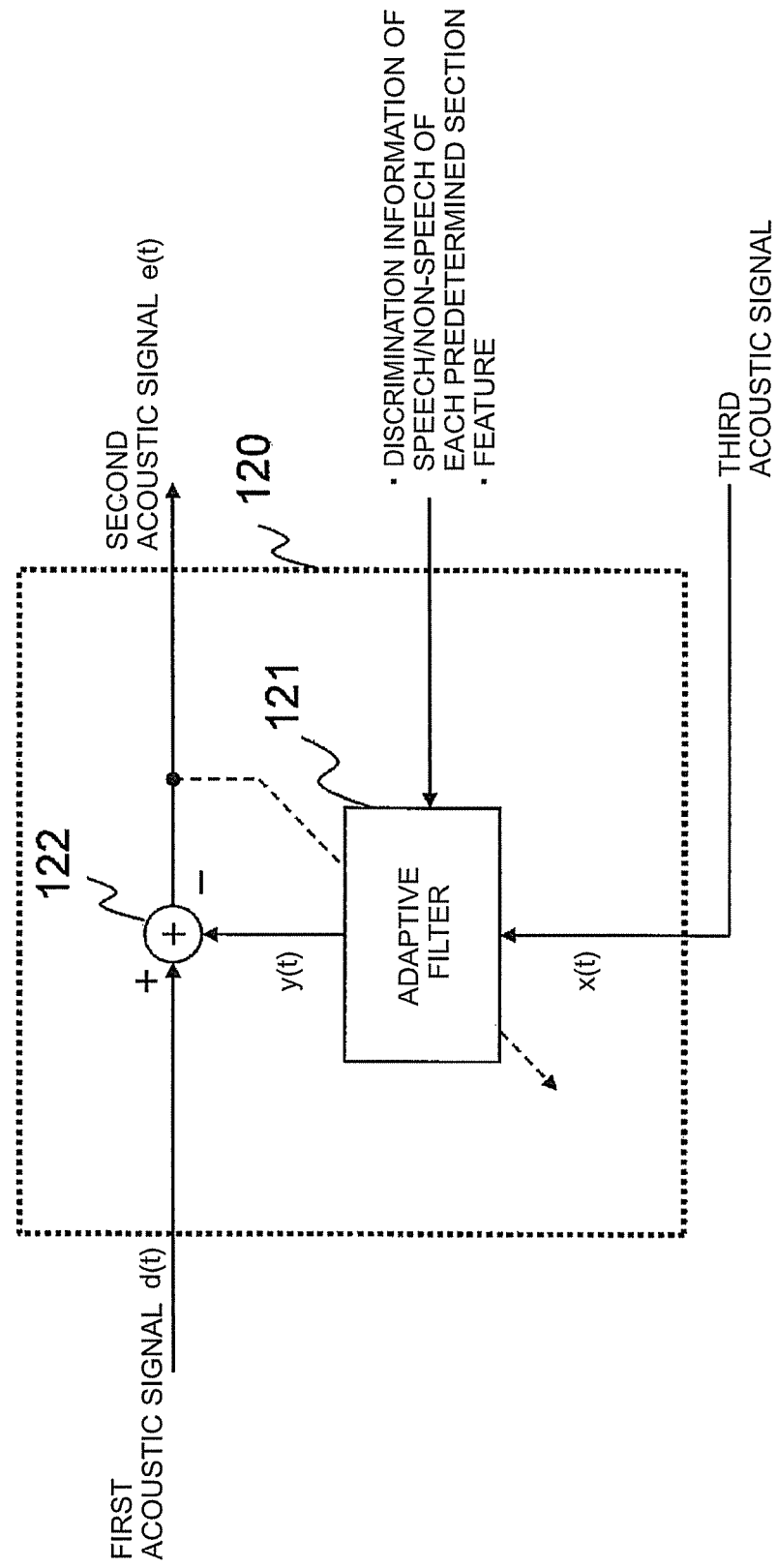
FIG. 2 is a block diagram of an echo canceller in FIG. 1.

FIG. 2 is a block diagram of the echo canceller 120. The echo canceller 120 suppresses an echo of the system sound included in the first acoustic signal (acquired via the microphone 140). In order to perform this processing, the echo canceller 120 estimates a transfer characteristic of an echo path from speakers 130-1~130-n to the microphone 140 by an adaptive filter 121 of FIR type. If the adaptive filter 121 can correctly estimates the transfer characteristic, an echo included in the first acoustic signal is completely suppressed. However, actually, an estimation error occurs by insufficiency to update adaptive filter coefficients or sudden change of the transfer characteristic. As a result, the echo remains in the second acoustic signal.

Furthermore, the echo canceller 120 utilizes a third acoustic signal generated by a monophonization unit 101 of the speech discrimination apparatus 100 (explained afterwards) as a reference signal. The third acoustic signal is generated by converting the system sound of a plurality of channels to an acoustic signal of a single channel. Accordingly, the echo canceller 120 cannot suppress an echo caused by a difference between each channel signal (of the system sound) and the third acoustic signal.

Figure 3:
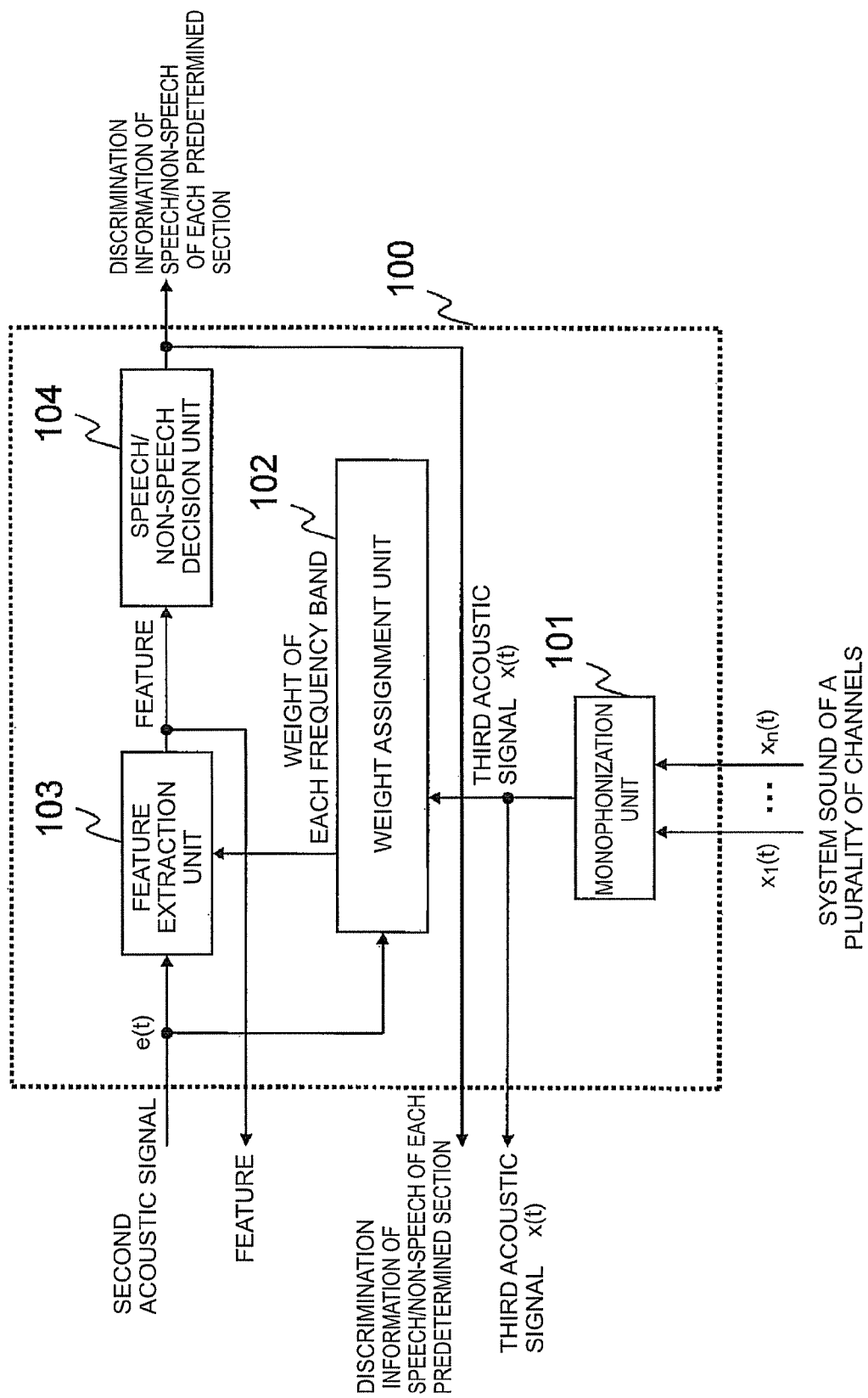
FIG. 3 is a block diagram of a speech discrimination apparatus in FIG. 1.

FIG. 3 is a block diagram of the speech discrimination apparatus 100. The speech discrimination apparatus 100 includes a monophonization unit 101, a weight assignment unit 102, a feature extraction unit 103, and a speech/non-speech discrimination unit 104. The monophonization unit 101 converts a system sound (composed by acoustic signals of a plurality of channels) to a third acoustic signal of a single channel. The weight assignment unit 102 assigns a small weight to a frequency band including a main element of the system sound and a large weight to other frequency bands by using amplitude of a frequency spectrum of the third acoustic signal (converted by the monophonization unit 101). The feature extraction unit 103 extracts a feature from the second acoustic signal by excluding a frequency spectrum of the frequency band to which the small weight is assigned by the weight assignment unit 102. The speech/non-speech discrimination unit 104 discriminates speech/non-speech of each section by using the feature extracted by the feature extraction unit 103.

The monophonization unit 101 converts the system sound (composed by a plurality of channels) to the third acoustic signal of the single channel reflecting a characteristic of the plurality of channels. The weight assignment unit 102 assigns a weight to each frequency band by using a frequency spectrum of the third acoustic signal. Accordingly, even if the system sound is composed by the plurality of channels, a small weight can be assigned to a frequency band having a high probability which a residual echo is included therein.

Moreover, the speech discrimination apparatus 100 outputs a feature (extracted by the feature extraction unit 103) and speech/non-speech discrimination information (from the speech/non-speech discrimination unit 104) to the echo canceller 120.

(Flow Chart)

Figure 4:
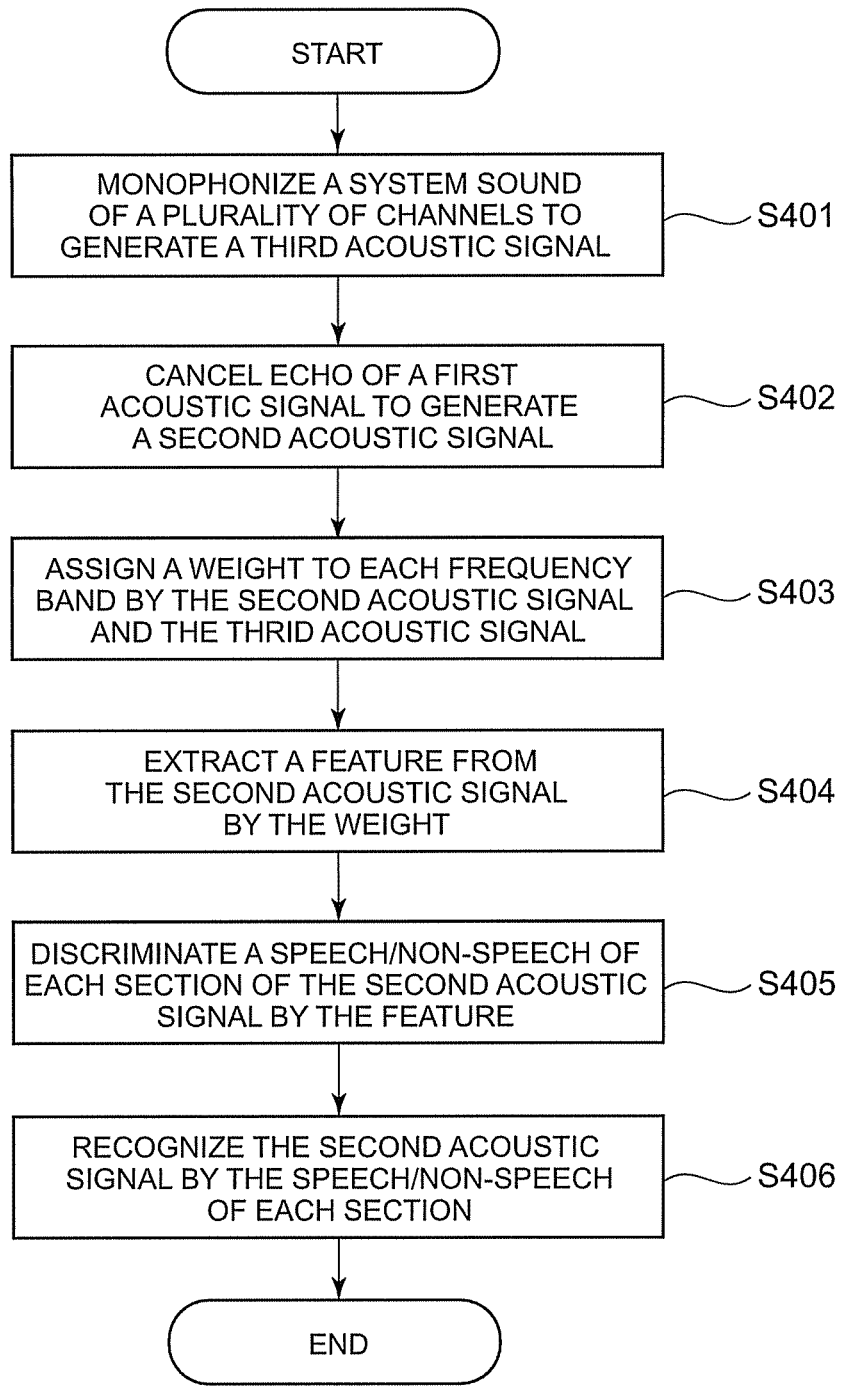
FIG. 4 is a flow chart of processing of the speech recognition system in FIG. 1.

FIG. 4 is a flow chart of the speech recognition system of the first embodiment. First, at S401, the monophonization unit 101 converts system sound $x_1(t) \sim x_n(t)$ of n-channels to a third acoustic signal x(t) of a single channel, and outputs the third acoustic signal to the weight assignment unit 102 and the echo canceller 120.

As to conversion by the monophonization unit 101, in order for all main elements of the system sound $x_1(t) \sim x_n(t)$ to include in the third acoustic signal, all signals of the system sound are averaged. This corresponds to a weighted sum of $x_1(t) \sim x_n(t)$ with a weight "1/n" (Hereinafter, this method is called "channel-weighted sum"). When levels of each channel are unequal, the levels can be equal by adjusting the weight of the weighted sum.

Furthermore, when a correlation among the system sound $x_1(t) \sim x_n(t)$ of n-channels is high, any of the system sound can be selected as the third acoustic signal (Hereinafter, this method is called "channel-selection"). Because it is expected that one channel of n-channels includes a main element common to n-channels.

In a speech recorded via a stereo-microphone (a stereophonic recorded sound), a correlation among channels is high. Accordingly, it is regarded as a system sound applicable the channel-selection. On the other hand, for example, as to a bilingual system sound of which a left channel is English and a right channel is Japanese, a correlation between two channels is low. Accordingly, the channel-weighted sum is more suitable. Based on usage situation of the system sound such as a stereophonic recorded sound or a speech of bilingual languages, the monophonization unit 101 may switch any method between the channel-weighted sum and the channel-selection.

At S402, the echo canceller 120 generates the second acoustic signal e(t) by canceling an echo of the system sound included in the first acoustic signal d(t). As a reference signal of the adaptive filter 121, the third acoustic signal x(t) generated by the monophonization unit 101 is used.

Assume that the adaptive filter 121 has filter coefficients of L units and i-th filter coefficient at time t is $w_i(t)$. The second acoustic signal e(t) in which the echo is suppressed is calculated by an equation (1).

$$e(t) = d(t) - y(t) \quad (1)$$
$$y(t) = \sum_{i=0}^{L-1} (w_i(t) \cdot x(t-i))$$
$$= w(t)^T x(t)$$
$$w(t) = [w_0(t), w_1(t), \ldots, w_{L-1}(t)]^T$$
$$x(t) = [x(t), x(t-1), \ldots x(t-L+1)]^T$$

For example, a filter coefficient $w_i(t)$ of the adaptive filter 121 is updated using NLMS algorithm by an equation (2).

$$w(t+1) = w(t) + \frac{\alpha}{x(t)^T x(t) + \gamma} e(t)x(t) \quad (2)$$

In the equation (2), $\alpha$ is a step size to adjust update speed, and $\gamma$ is a small positive value to prevent that a denominator term is equal to zero. $\alpha$ is approximately set to "0.1~0.3".

Next, at S403, by using an amplitude of a frequency spectrum of the third acoustic signal x(t), the weight assignment unit 102 calculates a weight $R_f(k)$ (k: frame number) of each frequency band f used for extraction of the feature (by the feature extraction unit 103).

The weight assignment unit 102 divides the third acoustic signal x(t) (acquires at sampling 16000 Hz) into each frame having a length 25 ms (400 samples) and an interval 8 ms (128 samples) respectively. As to this frame division, Hamming Window is used. Next, after setting zero of 112 points to each frame, the weight assignment unit 102 calculates a power spectrum $X_f(k)$ of the third acoustic signal x(t) by applying DFT (discrete Fourier transform) of 512 points. As to the power spectrum $X_f(k)$, the weight assignment unit 102 calculates a smoothed power spectrum $X'_f(k)$ by smoothing along a time direction with a recursive equation (3).

$$X'_f(k) = \mu \cdot X'_f(k-1) + (1-\mu) \cdot X_f(k) \quad (3)$$

In the equation (3), $X'_f(k)$ represent a smoothed power spectrum at a frequency band f, and $\mu$ represents a forgetting factor to adjust a smoothing degree. $\mu$ is approximately set to "0.3~0.5". The system sound propagates at the speed of sound along an echo path from speakers 130-1~130-n to the microphone 140. Accordingly, a residual echo included in the first acoustic signal shifts from the third acoustic signal along a time direction. By the smoothing processing, an element of a power spectrum of the present frame mixes into a power spectrum of a next frame. As a result, a time shift between the residual echo and the third acoustic signal is compensated.

Next, by using the smoothed power spectrum $X'_f(k)$ of the third acoustic signal, the weight assignment unit 102 assigns a weight "0" to a frequency band including a main element of the system sound, and a weight "1" to other frequency bands. Concretely, by comparing the smoothed power spectrum $X'_f(k)$ of the third acoustic signal to a first threshold $TH_X(k)$, the weight $R_f(k)$ is assigned to each frequency band f by using an equation (4).

if $X'_f(k) > TH_X(k)$ then $R_f(k) = 0$ else $R_f(k) = 1$ \quad (4)

The first threshold $TH_X(k)$ needs to have a value suitable for detection of a frequency band including the main element of the system sound. For example, the first threshold $TH_X(k)$ can be set to a value larger than a power of a silent section of the third acoustic signal. Furthermore, as shown in an equation (5), an averaged power value of each frame can be set as the first threshold.

$$TH_X(k) = \frac{1}{P} \sum_{f=0}^{P-1} X'_f(k) \quad (5)$$

In the equation (5), P represent the number of frequency bands f. In this case, the first threshold dynamically changes for each frame.

Moreover, by sorting a smoothed power spectrum $X'_f(k)$ of each frame in order of smaller value (for a frequency index f), a weight "0" may be assigned to a frequency band belonging to a higher rank a % (For example, 50%) in the sorted result, and a weight "1" may be assigned to other frequency bands. Furthermore, as to smoothed power spectrums $X'_f(k)$ larger than the first threshold, by sorting them in order of smaller value, a weight "0" may be assigned to a frequency band belonging to a higher rank a % (For example, 50%) in the sorted result, and a weight "1" may be assigned to other frequency bands.

Furthermore, the weight may not be limited to any of "0" and "1". In this case, as shown in an equation (6), the weight can be assigned as a value monotonously reducing between "0" and "1" based on the power.

$$\begin{aligned}&\text{if } \log_{10} X'_f(k) > TH_1 \text{ then } R_f(k) = 0 \\ &\text{else if } \log_{10} X'_f(k) < TH_2 \text{ then } R_f(k) = 1 \\ &\text{else } R_f(k) = 1 - \frac{\log_{10} X'_f(k) - TH_2}{TH_1 - TH_2}\end{aligned} \quad (6)$$

In the equation (6), thresholds $TH_1$ and $TH_2$ are determined based on the first threshold $TH_X(k)$, by using an equation (7). In the equation (7), $\alpha$ and $\beta$ can be experimentally calculated. For example, assume that they are set to "0.6". In this case, if $TH_X(k)$ represents an averaged power of each frame, four times and one fourth times of the averaged power are set as $TH_1$ and $TH_2$ respectively.

$TH_1 = TH_X(k) + \alpha$ $TH_2 = TH_X(k) - \beta$ \quad (7)

The third acoustic signal x(t) (converted by the monophonization unit 101) is a signal reflecting a main element of a system sound of a plurality of channels. Accordingly, by using amplitude of a smoothed power spectrum $X'_f(k)$ of the third acoustic signal, the weight can be assigned to each frequency band by taking the main element into consideration.

At S404, by using the weight $R_f(k)$ of each frequency band (acquired by the weight assignment unit 102), the feature extraction unit 103 extracts a feature representing the user's speech from the second acoustic signal e(t).

In the first embodiment, an average of a feature (SNR) of each frequency band is calculated by an equation (8. Hereinafter, this average ($SNR_{avrg}(k)$) is called "averaged SNR".

$$SNR_{avrg}(k) = \frac{1}{M(k)} \sum_{f=0}^{P-1} snr_f(k) \cdot R_f(k) \quad (8)$$

$$snr_f(k) = \log_{10}\left(\frac{MAX(N_f(k), D'_f(k))}{N_f(k)}\right)$$

In the equation (8), M(k) represents the number of frequency bands f each of which has the weight "$R_f(k)=1$" at k-th frame. Furthermore, $N_f(k)$ represents an estimation value of a power spectrum of a section not including a user's speech in the second acoustic signal. For example, the estimation value is calculated by averaging power spectrums of 20 frames from the head of the second acoustic signal. In general, the second acoustic signal in a section including the user's speech is larger than the second acoustic signal in a section not including the user's speech. Accordingly, the larger the averaged SNR is, the higher the probability that the second acoustic signal includes the user's speech is. Moreover, the feature is not limited to the averaged SNR. For example, normalized spectral entropy or an inter-spectral cosine value may be used as the feature.

By using the equation (8), the feature extraction unit 103 extracts a feature by excluding a frequency spectrum of the frequency band having the weight "$R_f(k)=0$" (assigned by the weight assignment unit 102). The frequency band having the weight "0" (in case of continuous value, "$R_f(k) \approx 0$") is a frequency band having a high probability which an echo caused by the system sound (of a plurality of channels) is included. Accordingly, as shown in the equation (8), by calculating a feature multiplied with the weight $R_f(k)$, a degree which a frequency spectrum of the frequency band having the weight "$R_f(k)=0$" (or "$R_f(k) \approx 0$") contributes to the feature can be lowered. As a result, the feature excluding an influence of the residual echo can be extracted.

At S405, the speech/non-speech discrimination unit 104 discriminates speech/non-speech of each frame by comparing the feature (extracted by the feature extraction unit 103) to a threshold $TH_{VA}(k)$, as shown in an equation (9).

if $SNR_{avrg}(k) > TH_{VA}(k)$ then k-th frame is speech else k-th frame is non-speech (9)

At S406, the speech recognition unit 110 specifies a user's speech section (as a recognition target) by using a discrimination result of each frame output by the speech discrimination apparatus 100. Furthermore, the speech recognition unit 110 executes speech recognition of the second acoustic signal e(t) output by the echo canceller 120.

In above explanation, the power spectrum is used as a frequency spectrum. However, an amplitude spectrum may be used.

(Effect)

As mentioned-above, in the speech discrimination apparatus of the first embodiment, a weight is assigned to each frequency band by using amplitude of a power spectrum of the third acoustic signal (monophonized from the system sound of a plurality of channels). Accordingly, the weight can be assigned by taking a main element of the system sound of the plurality of channels into consideration.

Furthermore, in the speech discrimination apparatus of the first embodiment, a feature is extracted by using the weight which the main element of the system sound of the plurality of channels is taken into consideration. Accordingly, the feature from which an echo of the system sound of the plurality of channels is reduced can be extracted.

(The First Modification)

The weight assignment unit 102 can assign a weight to each frequency band by using not only a smoothed power spectrum $X'_f(k)$ of the third acoustic signal but a power spectrum $E_f(k)$ of the second acoustic signal. For example, the weight $R_f(k)$ is assigned by an equation (10).

if $X'_f(k) > TH_X(k)$ & $E_f(k) < TH_E(k)$ then $R_f(k)=0$ else $R_f(k)=1$ (10)

In the equation (10), the second threshold $TH_E(k)$ is set to a value larger than a power of a silent section of the second acoustic signal.

In this way, by assigning the weight using not only the third acoustic signal but the second acoustic signal, it is prevented that a small weight is assigned to a frequency band including a main element of the user's speech.

(The Second Modification)

The adaptive filter 121 may control update of filter coefficients using a feature $SNR_{avrg}(k)$ (extracted by the feature extraction unit 130) and a threshold $TH_{DT}(k)$, as shown in an equation (11). Briefly, when it is discriminated that the first acoustic signal does not include the user's speech, the adaptive filter 121 updates filter coefficients. As a result, the adaptive filter 121 can correctly estimate a transfer characteristic of an echo path.

if $SNR_{avrg}(k) < TH_{DT}(k)$ then update of filter coefficients else non-update of filter coefficients (11)

Furthermore, by inputting speech/non-speech discrimination information from the speech/non-speech discrimination unit 104, the adaptive filter 121 may update filter coefficients in case of non-speech, and not update the filter coefficients in case of speech. Alternatively, when the feature $SNR_{avrg}(k)$ is larger, the adaptive filter 121 may control a step size α of the equation (2) to be smaller.

(The Third Modification)

In the first embodiment, the weight assignment unit 102 assigns a weight "0" to a frequency band in which a smoother power spectrum $X'_f(k)$ of the third acoustic signal is larger than the first threshold $TH_X(k)$, and a weight "1" to other frequency bands. However, the weight is not limited to above-mentioned example. For example, by assigning a weight "−100" to the frequency band in which $X'_f(k)$ is larger than the first threshold $TH_X(k)$ and a weight "100" to other frequency bands, when the feature extraction unit 102 extracts a feature, a frequency spectrum of the frequency band to which weight "−100" is assigned may be excluded.

The Second Embodiment (Block Component)

Figure 5:
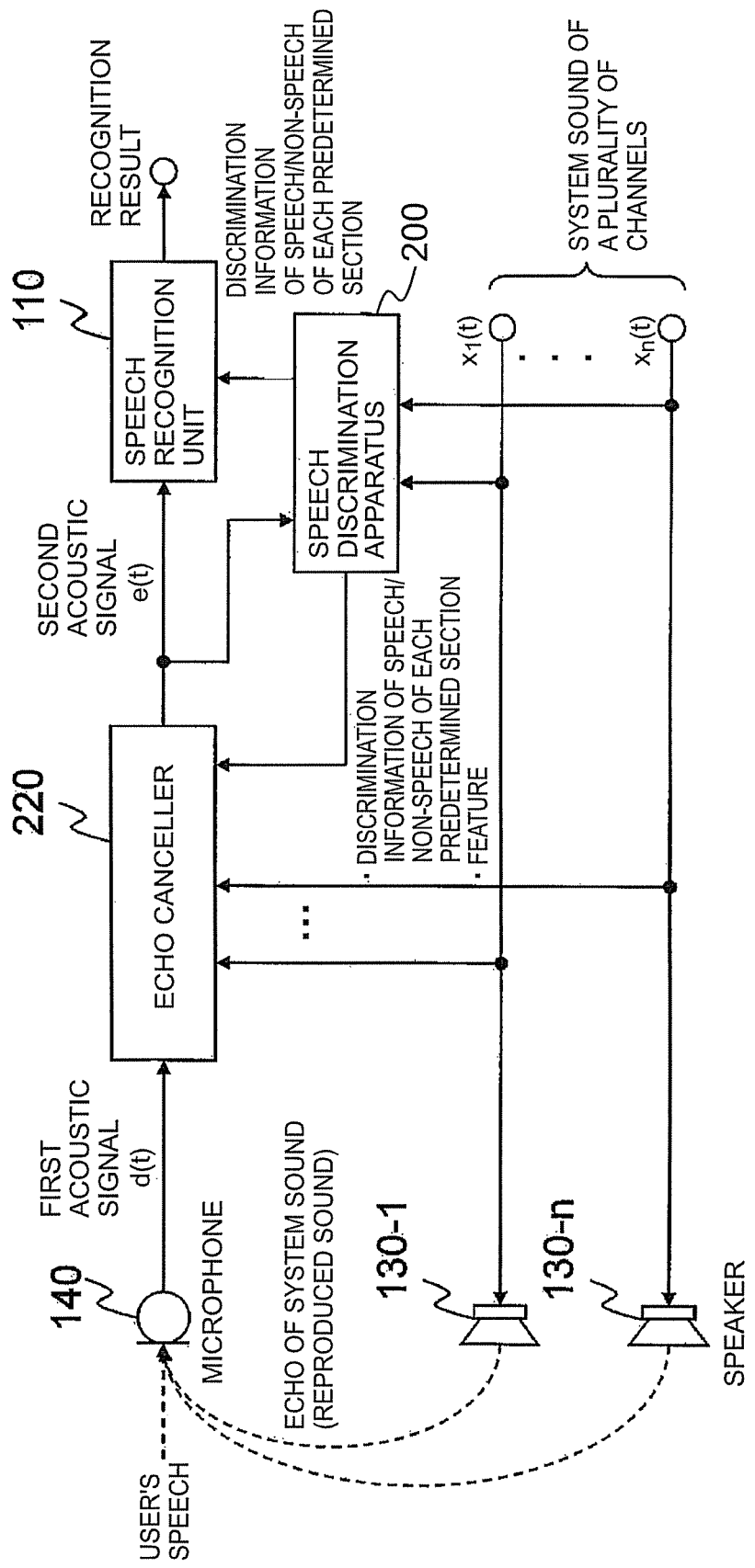
FIG. 5 is a block diagram of the speech recognition system according to a second embodiment.

FIG. 5 is a block diagram of a speech recognition system including a speech discrimination apparatus of the second embodiment. As a different point from the first embodiment, an echo canceller 220 acquires not the third acoustic signal (monophonized) but a system sound of a plurality of channels.

Figure 6:
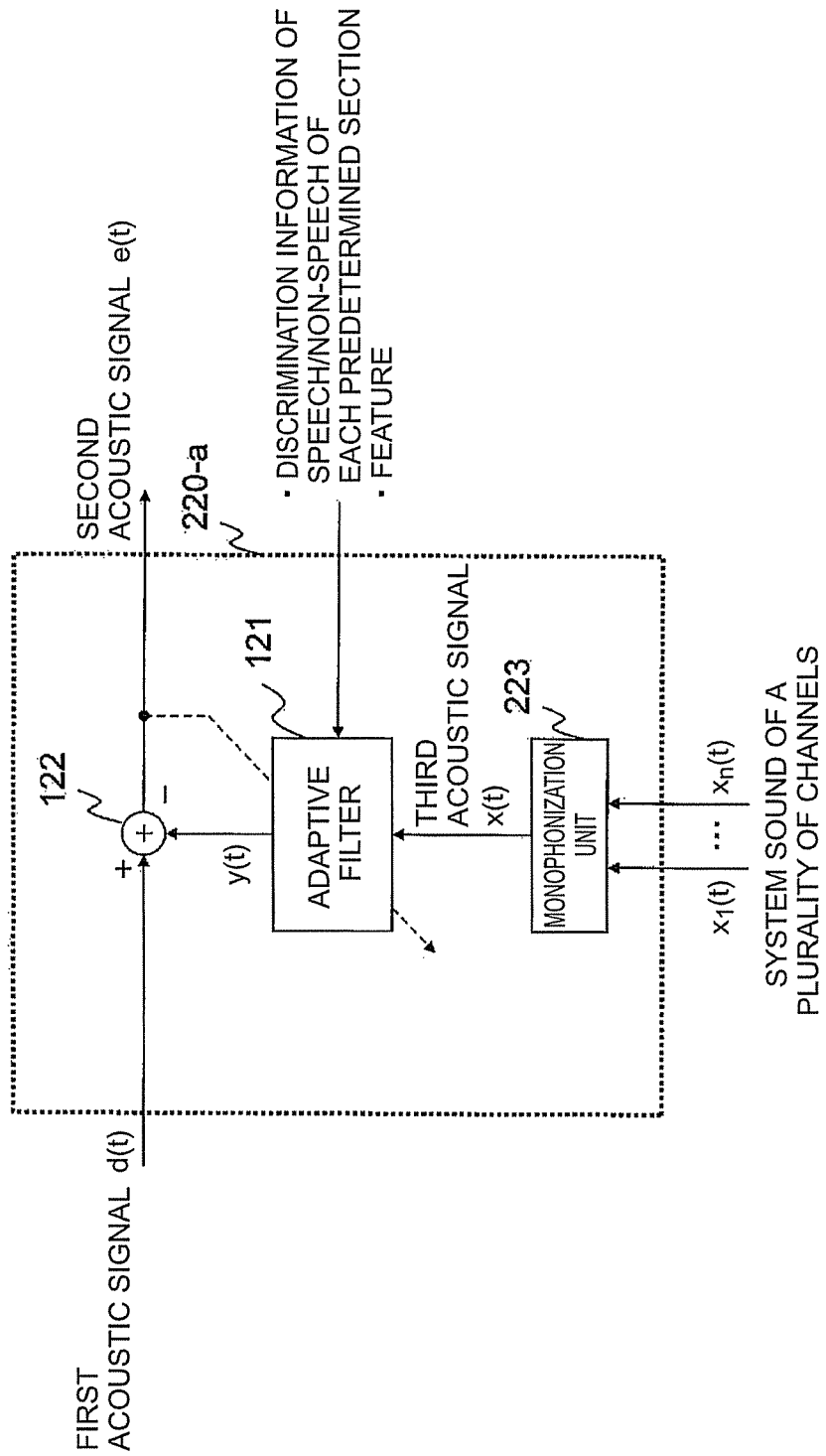
FIG. 6 is a block diagram of one example of an echo canceller in FIG. 5.

FIG. 6 is a block diagram of one example of the echo canceller 220. In FIG. 6, an echo canceller 220-a includes a monophonization unit 223 to monophonize a system sound of a plurality of channels. A third acoustic signal (converted to a single channel by the monophonization unit 223) is a reference signal used by the adaptive filter 121. Processing by the monophonization unit 223 is executed in the same way as the monophonization unit 101 of the first embodiment. Furthermore, update of the adaptive filter and generation of the second acoustic signal (after suppressing the echo) are executed in the same way as the first embodiment.

Figure 7:
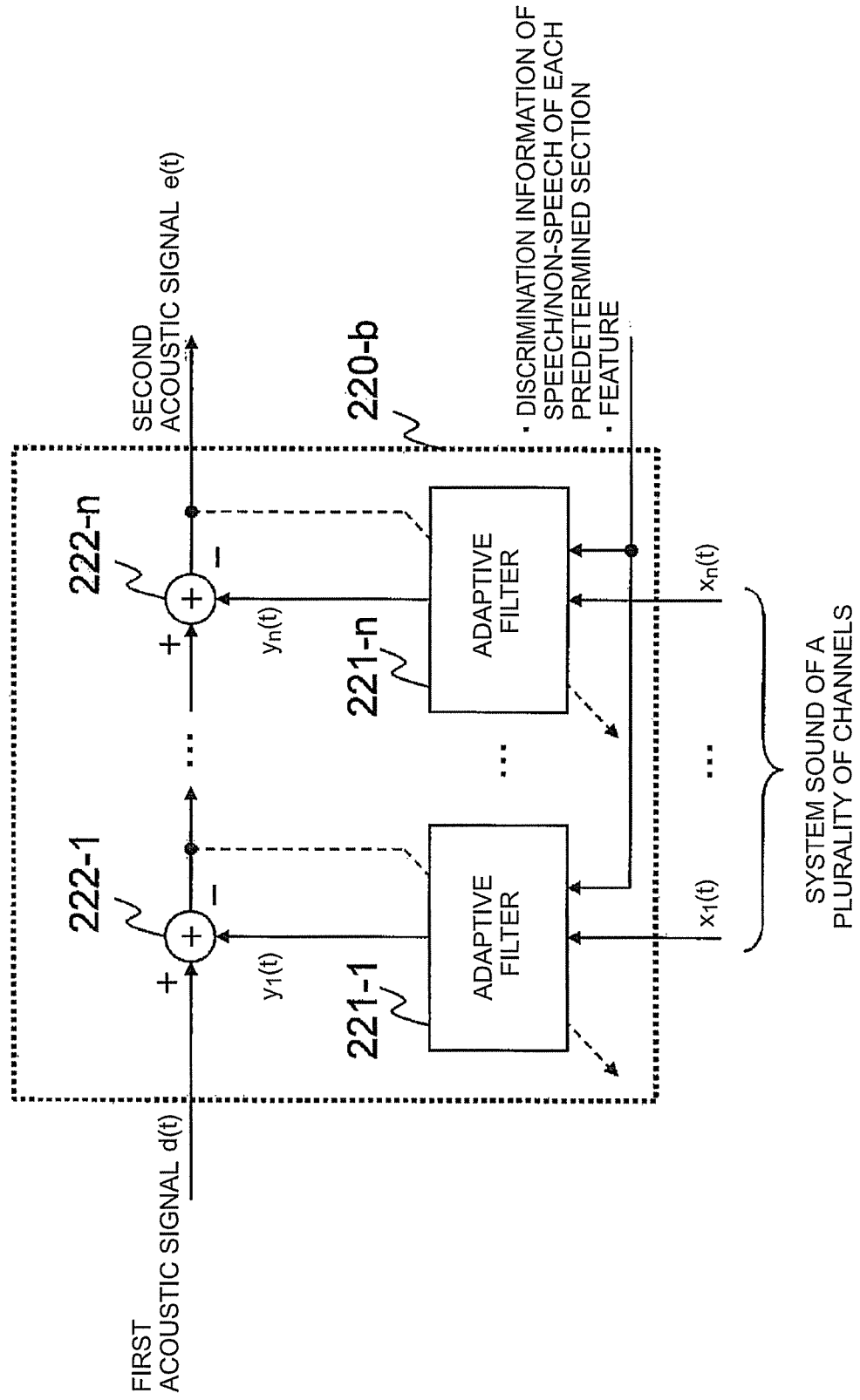
FIG. 7 is a block diagram of another example of the echo canceller in FIG. 5.

FIG. 7 is a block diagram of another example of the echo canceller 220. In FIG. 7, an echo canceller 220-b cancels each echo of a plurality of channels. Concretely, the echo canceller 220-b includes adaptive filters 221-1~221-n and subtractors 222-1~222-n corresponding to each channel of the system sound. Update of each adaptive filter and generation of the second acoustic signal (after suppressing the echo) are executed in the same way as the first embodiment.

Figure 8:
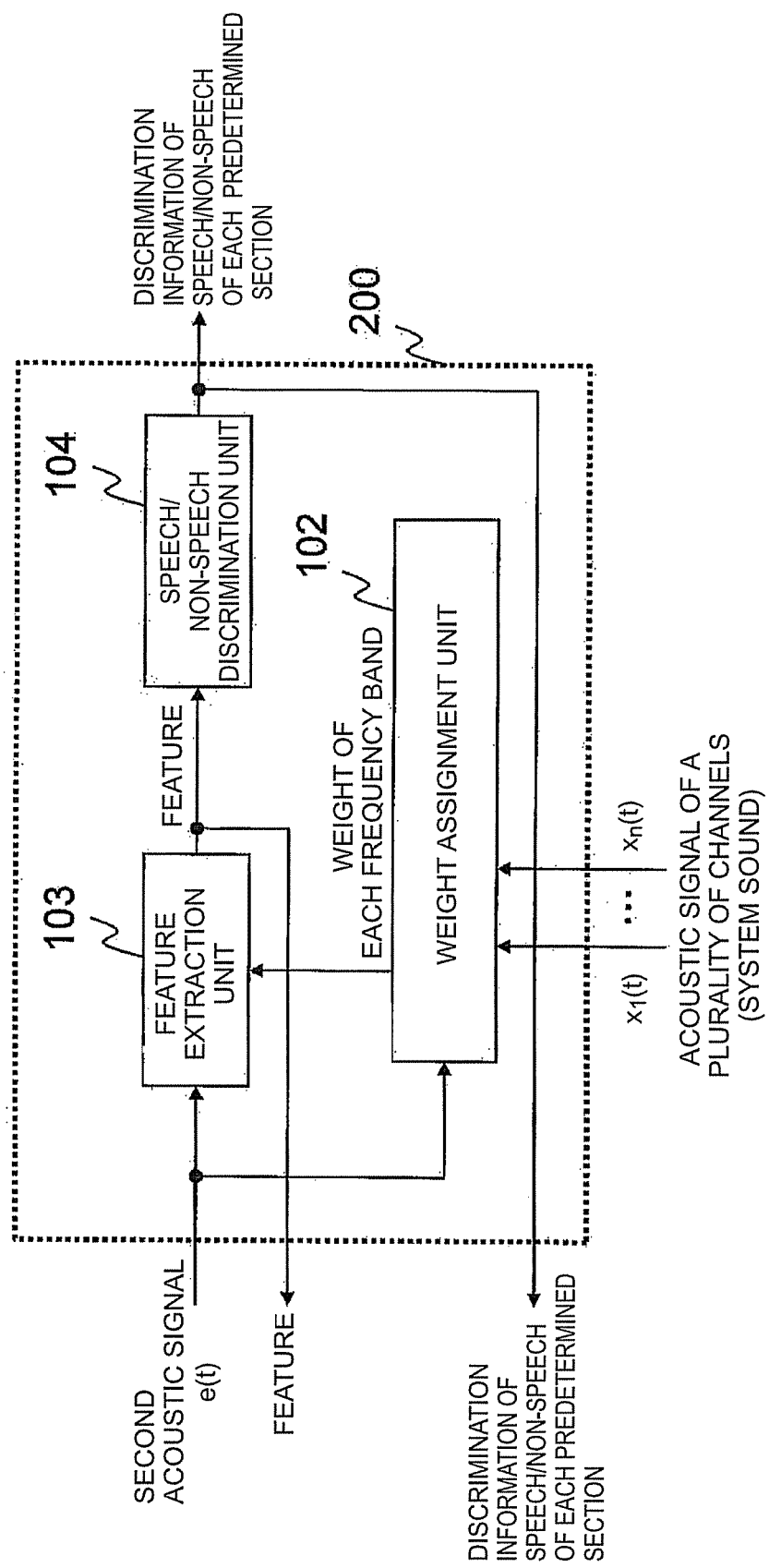
FIG. 8 is a block diagram of the speech discrimination apparatus in FIG. 5.

FIG. 8 is a block diagram of the speech discrimination apparatus 200. As a different point from the speech discrimination apparatus 100 of the first embodiment, the speech discrimination apparatus 200 does not include the monophonization unit 101. In the speech discrimination apparatus 200, the weight assignment unit 102 assigns a weight to each frequency band by using a frequency spectrum of the system sound $x_1(t) \sim x_n(t)$ of a plurality of channels.

(Flow Chart)

Figure 9:
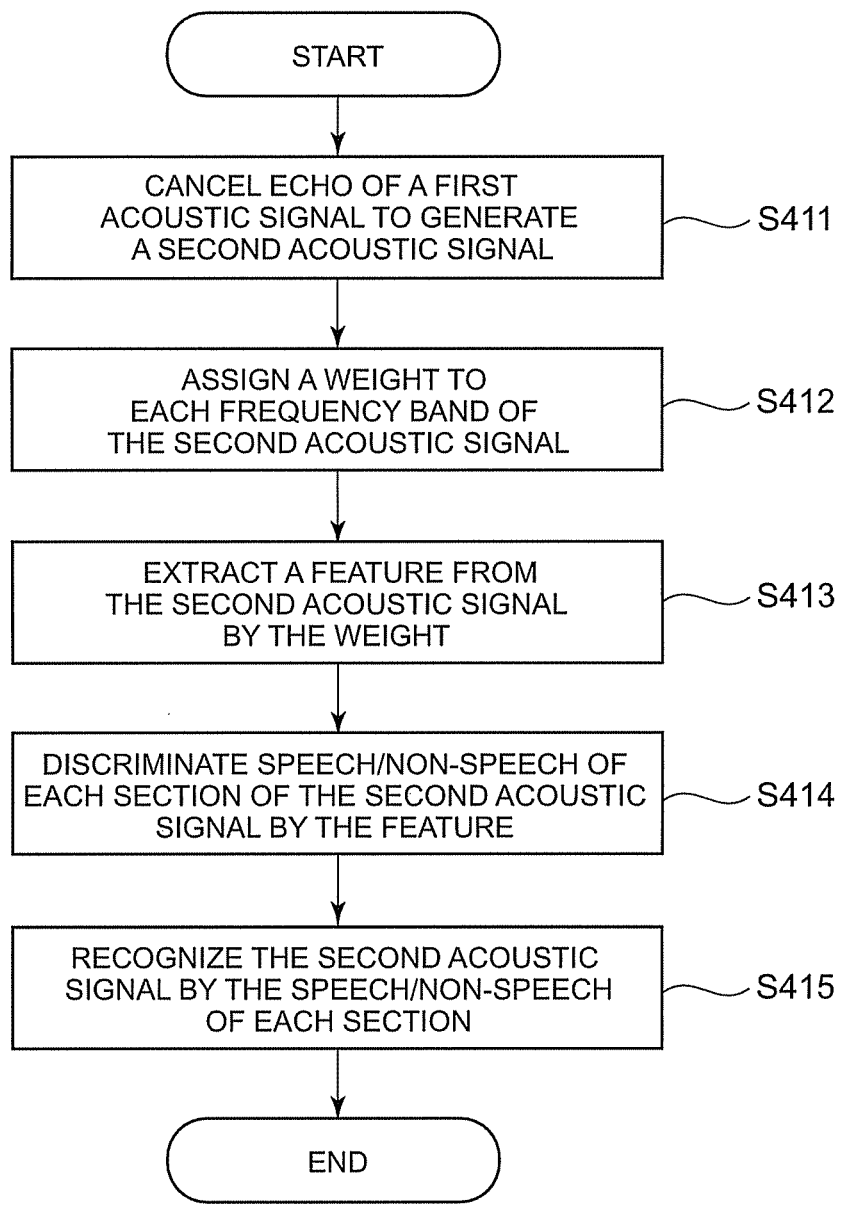
FIG. 9 is a flow chart of processing of the speech recognition system in FIG. 5.

FIG. 9 is a flow chart of the speech recognition system of the second embodiment. First, at S411, the echo canceller 220 generates the second acoustic signal e(t) by suppressing an echo of the system sound included in the first acoustic signal d(t).

Next, at S412, by using frequency spectrums of the second acoustic signal e(t) and the system sound $x_1(t) \sim x_n(t)$ of a plurality of channels, the weight assignment unit 102 calculates a weight $R_f(k)$ of each frequency band f, which is used by the feature extraction unit 103 to extract a feature. As the weight, a small value is assigned to a frequency band having a high probability which not the user's speech but the residual echo is included, and a large value is assigned to other frequency bands.

The weight assignment unit 102 divides the second acoustic signal e(t) (acquires at sampling 16000 Hz) and the system sound $x_1(t) \sim x_n(t)$ (of a plurality of channels) into each frame having a length 25 ms (400 samples) and an interval 8 ms (128 samples) respectively. As to this frame division, Hamming Window is used. Next, after setting zero of 112 points to each frame, the weight assignment unit 102 calculates a power spectrum $E_f(k)$ of the second acoustic signal e(t) and power spectrums $X_{1f}(k) \sim X_{nf}(k)$ of the system sound $x_1(t) \sim x_n(t)$ by applying DFT (discrete Fourier transform) of 512 points. As to the power spectrums $E_f(k)$ and $X_{1f}(k) \sim X_{nf}(k)$, the weight assignment unit 102 calculates a smoothed power spectrum $E'_f(k)$ and $X'_{1f}(k) \sim X'_{nf}(k)$ in the same way as the equation (3).

Next, by using the smoothed power spectrum $E'_f(k)$ of the second acoustic signal, the weight assignment unit 102 assigns a weight "−1" to a frequency band not including a main element of the user's speech, and a weight "1" to other frequency bands. Concretely, by comparing the smoothed power spectrum $E'_f(k)$ of the second acoustic signal to a second threshold $TH_E(k)$, the weight $R_f(k)$ is assigned to each frequency band f by using an equation (12).

if $E'_f(k) < TH_E(k)$ then $R_f(k) = -1$ else $R_f(k) = 1$ (12)

The second threshold $TH_E(k)$ needs to have a value suitable for detection of a frequency band including the main element of the user's sound. For example, the second threshold $TH_E(k)$ can be set to a value larger than a power of a silent section of the second acoustic signal (For example, a section of "100 msec" immediately after activation).

Next, by using smoothed power spectrums $X'_{1f}(k) \sim X'_{nf}(k)$ of the system sound, the weight assignment unit 102 detects a frequency band (main frequency band of disturbance) having a high probability which an echo of the system sound has mixed among frequency bands not including the main element of the user's speech. Concretely, by analyzing smoothed power spectrums $X'_{1f}(k) \sim X'_{nf}(k)$ in order of channel, the weight assignment unit 102 detects a frequency band having a large power as a main frequency band of disturbance, and assigns a weight "0" thereto. As to the main frequency band of disturbance, a power of the system sound (output from speakers 130-1~130-n) is large. Accordingly, a probability which a residual echo is included in this frequency band is high. As to the frequency band having the weight "$R_f(k) = -1$" by the equation (12), the weight assignment unit 102 compares the smoothed power spectrums $X'_{1f}(k) \sim X'_{nf}(k)$ to the first threshold $TH_X(k)$, and updates the weight $R_f(k)$ by an equation (13).

if $R_f(k) = -1$ if $X'_{cf}(k) > TH_X(k)$ then $R_f(k) = 0$ (13)

In the equation (13), "c" represents a channel number c ($1 \le c \le n$). As shown in an equation (14), the first threshold $TH_X(k)$ can be an averaged power value of each frame of all channels.

$$TH_X(k) = \frac{1}{nP} \sum_{c=1}^{n} \sum_{f=0}^{P-1} X'_{cf}(k)$$ (14)

The weight assignment unit 102 executes processing of the equation (15) in order of smaller channel number (from c=1 to c=n). As a result, threshold processing for the frequency band having "$R_f(k)=0$" (already detected as the main frequency band of disturbance) is skipped.

Last, the weight assignment unit 102 replaces the weight "$R_f(k)=-1$" with "$R_f(k)=1$" by an equation (15)

if $R_f(k) = -1$ then $R_f(k) = 1$ (15)

Lastly, $R_f(k)$ is "0" or "1". A frequency band having "$R_f(k)=0$" is the main frequency band of disturbance having a high probability which not a main element of the user's speech but a disturbance sound is included. In the second embodiment, the weight assignment unit 102 assigns a weight to each frequency band by using a power spectrum of the acoustic signal of each channel (composing the system sound). Accordingly, the weight can be assigned by taking a main element of the system sound of the plurality of channels into consideration.

Next, at S413, in the same way as the first embodiment, by excluding a frequency spectrum of the frequency band having "$R_f(k)=0$" (acquired by the weight assignment unit 102), a feature representing characteristic of the user's speech is extracted from the second acoustic signal e(t). Processing from S413 to S415 is same as processing from S404 to S406 in the first embodiment. Accordingly, its explanation is omitted.

(Effect)

As mentioned-above, in the speech discrimination apparatus of the second embodiment, a weight is assigned to each frequency band by using a power spectrum of the acoustic signal of each channel (composing the system sound) and a power spectrum of the acoustic signal including the user's speech. Accordingly, the weight can be assigned by taking the system sound of the plurality of channels and a main element of the user's speech into consideration.

Furthermore, in the speech discrimination apparatus of the second embodiment, a feature is extracted by using the weight which the system sound of the plurality of channels and the main element of the user's speech are taken into consideration. Accordingly, the feature, which reduces an influence of a frequency spectrum of a frequency band having a high probability that not the user's speech but the residual echo is included, can be extracted.

As to the speech discrimination apparatus according to at least one of embodiments and modifications, a weight is assigned to each frequency band by using the system sound of a plurality of channels. Accordingly, the weight can be assigned by taking a main element of the system sound of the plurality of channels into consideration.

In the disclosed embodiments, the processing can be performed by a computer program stored in a computer-readable medium.

In the embodiments, the computer readable medium may be, for example, a magnetic disk, a flexible disk, a hard disk, an optical disk (e.g., CD-ROM, CD-R, DVD), an optical magnetic disk (e.g., MD). However, any computer readable medium, which is configured to store a computer program for causing a computer to perform the processing described above, may be used.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A speech recognition system, comprising:
a plurality of speakers that reproduce a system sound having a plurality of channels;
a microphone that generates a first acoustic signal including a user's speech and an echo of the system sound;
an echo canceller that generates a second acoustic signal by suppressing the echo included in the first acoustic signal;
a monophonization unit that generates a third acoustic signal by monophonizing the system sound and outputs the third acoustic signal to the echo canceller,
the third acoustic signal of a single channel reflecting a characteristic of the plurality of channels by channel-weighted sum if a correlation among the plurality of channels is smaller than a threshold or by channel-selection if the correlation is not smaller than the threshold;
a weight assignment unit that assigns a weight to each frequency band of the system sound, based on an amplitude of a frequency spectrum of the third acoustic signal;
a feature extraction unit that extracts a feature from the second acoustic signal based on the weight of each frequency band; and
a speech/non-speech discrimination unit that discriminates speech/non-speech of the second acoustic signal based on the feature; and
a speech recognition unit that recognizes the second acoustic signal, based on a discrimination result of the speech/non-speech;
wherein the echo canceller suppresses the echo included in the first acoustic signal, based on the third acoustic signal.

2. The system according to claim 1, wherein
the weight assignment unit assigns a predetermined weight to a frequency band in which a frequency spectrum of the third acoustic signal is larger than a first threshold, and
the feature extraction unit extracts the feature by excluding frequency spectrums of the frequency band to which the predetermined weight is assigned.

3. The system according to claim 1, wherein
the weight assignment unit assigns a predetermined weight to a frequency band in which a frequency spectrum of the third acoustic signal is larger than a first threshold and a frequency spectrum of the second acoustic signal is smaller than a second threshold, and
the feature extraction unit extracts the feature by excluding frequency spectrums of the frequency band to which the predetermined weight is assigned.

4. The system according to claim 1, wherein
the weight assignment unit assigns a weight to each frequency band so that the weight is smaller when a frequency spectrum of the third acoustic signal is larger, and
the feature extraction unit makes a degree which a frequency spectrum of a frequency band contributes to the feature be smaller when the weight assigned to the frequency band is smaller.

5. A speech recognition system, comprising:
a plurality of speakers that reproduce a system sound having a plurality of channels;
a microphone that generates a first acoustic signal including a user's speech and an echo of the system sound;
an echo canceller that generates a second acoustic signal by suppressing the echo included in the first acoustic signal and generates a third acoustic signal by monophonizing the system sound,
the third acoustic signal of a single channel reflecting a characteristic of the plurality of channels by channel-weighted sum if a correlation among the plurality of channels is smaller than a threshold or by channel-selection if the correlation is not smaller than the threshold;
a weight assignment unit that assigns a weight to each frequency band of the system sound, based on an amplitude of a frequency spectrum of each channel composing the system sound;
a feature extraction unit that extracts a feature from the second acoustic signal based on the weight of each frequency band;
a speech/non-speech discrimination unit that discriminates speech/non-speech of the second acoustic signal based on the features; and
a speech recognition unit that recognizes the second acoustic signal, based on a discrimination result of the speech/non-speech;

wherein the echo canceller suppresses the echo included in the first acoustic signal, based on the third acoustic signal.

6. The system according to claim 5, wherein the weight assignment unit assigns a predetermined weight to a frequency band in which a frequency spectrum of one of the plurality of channels is larger than a first threshold and a frequency spectrum of the second acoustic signal is smaller than a second threshold, and the feature extraction unit extracts the feature by excluding frequency spectrums of the frequency band to which the predetermined weight is assigned.

7. A method for controlling a speech recognition system the method, comprising:

reproducing by a plurality of speakers, a system sound having a plurality of channels;

generating by a microphone, a first acoustic signal including a user's speech and an echo of the system sound;

generating by an echo canceller, a second acoustic signal by suppressing the echo included in the first acoustic signal;

generating by a monophonization unit in a speech discrimination apparatus, a third acoustic signal by monophonizing the system sound, the third acoustic signal of a single channel reflecting a characteristic of the plurality of channels by channel-weighted sum if a correlation among the plurality of channels is smaller than a threshold or channel selection if the correlation is not smaller than the threshold;

assigning by a weight assignment unit in the speech discrimination apparatus, a weight to each frequency band of the system sound, based on an amplitude of a frequency spectrum of the third acoustic signal;

extracting by a feature extraction unit in the speech discrimination apparatus, a feature from a second acoustic signal based on the weight of each frequency band;

discriminating by a speech/non-speech discrimination unit in the speech discrimination apparatus, speech/non-speech of the second acoustic signal based on the feature; and outputting by the speech discrimination apparatus, a discrimination result of the speech/non-speech to a speech recognition unit to recognize the second acoustic signal; and outputting by the speech discrimination apparatus, the third acoustic signal to the echo canceller to suppress the echo included in the first acoustic signal.

8. A non-transitory computer readable medium for causing a computer to perform a method for controlling a speech recognition system the method comprising:

reproducing by a plurality of speakers, a system sound having a plurality of channels;

generating by a microphone, a first acoustic signal including a user's speech and an echo of the system sound;

generating by an echo canceller, a second acoustic signal by suppressing the echo included in the first acoustic signal;

generating by a monophonization unit in a speech discrimination apparatus, a third acoustic signal by monophonizing the system sound, the third acoustic signal of a single channel reflecting a characteristic of the plurality of channels by channel-weighted sum if a correlation among the plurality of channels is smaller than a threshold or by channel selection if the correlation is not smaller than the threshold;

assigning by a weight assignment unit in the speech discrimination apparatus, a weight to each frequency band of the system sound, based on an amplitude of a frequency spectrum of the third acoustic signal;

extracting by a feature extraction unit in the speech discrimination apparatus, a feature from the second acoustic signal based on the weight of each frequency band;

discriminating by a speech/non-speech discrimination unit in the speech discrimination apparatus, speech/non-speech of the second acoustic signal based on the feature;

outputting by the speech discrimination apparatus, a discrimination result of the speech/non-speech to a speech recognition unit to recognize the second acoustic signal; and outputting by the speech discrimination apparatus, the third acoustic signal to the echo canceller to suppress the echo included in the first acoustic signal.

9. A method for controlling a speech recognition system the method comprising:

reproducing by a plurality of speakers, a system sound having the plurality of channels;

generating by a microphone, a first acoustic signal including a user's speech and an echo of the system sound;

generating by an echo canceller, a second acoustic signal by suppressing the echo included in the first acoustic signal;

generating by a monophonization unit in the echo canceller, a third acoustic signal by monophonizing the system sound, the third acoustic signal of a single channel reflecting a characteristic of the plurality of channels by channel-weighted sum if a correlation among the plurality of channels is smaller than a threshold or by channel-selection if the correlation is not smaller than the threshold;

assigning by a weight assignment unit in the speech discrimination apparatus, a weight to each frequency band of the system sound, based on an amplitude of a frequency spectrum of each channel composing the system sound;

extracting by a feature extraction unit in the speech discrimination apparatus, a feature from the second acoustic signal based on the weight of each frequency band;

discriminating by a speech/non-speech discrimination unit in the speech discrimination apparatus, speech/non-speech of the second acoustic signal based on the feature;

outputting by the speech discrimination apparatus a discrimination result of the speech/non-speech to a speech recognition unit to recognize the second acoustic signal; and suppressing by the echo canceller, the echo included in the first acoustic signal, based on the third acoustic signal.

10. A non-transitory computer readable medium for causing a computer to perform a method for controlling a speech recognition system wherein the method comprising:

reproducing by a plurality of speakers, a system sound having a plurality of channels;

generating by a microphone, a first acoustic signal including a user's speech and an echo of the system sound;

generating by an echo canceller, a second acoustic signal by suppressing the echo included in the first acoustic signal;

generating by a monophonization unit in the echo canceller, a third acoustic signal by monophonizing the system sound;
the third acoustic signal of a single channel reflecting a characteristic of the plurality of channels by channel-weighted sum if a correlation among the plurality of channels is smaller than a threshold or by channel-selection if the correlation is not smaller than the threshold;
assigning by a weight assignment unit in a speech discrimination apparatus, a weight to each frequency band of the system sound, based on an amplitude of a frequency spectrum of each channel composing the system sound;
extracting by a feature extraction unit in the speech discrimination apparatus, a feature from the second acoustic signal based on the weight of each frequency band;
discriminating by a speech/non-speech discrimination unit in the speech discrimination apparatus, speech/non-speech of the second acoustic signal based on the feature;
outputting by the speech discrimination apparatus, a discrimination result of the speech/non-speech to the speech recognition unit to recognize the second acoustic signal; and
suppressing by the echo canceller, the echo included in the first acoustic signal, based on the third acoustic signal.

* * * * *